(12) United States Patent
Cheng et al.

(10) Patent No.: US 8,230,471 B2
(45) Date of Patent: Jul. 24, 2012

(54) METHOD OF SHARING CHANNEL INFORMATION AND RELATED DEVICE

(75) Inventors: Ming-Yen Cheng, Taipei (TW); Jiun-Sian Chu, Kaohsiung (TW)

(73) Assignee: CyberLink Corp., Xindian Dist., New Taipei (TW)

( * ) Notice: Subject to any disclaimer, the term of this patent is extended or adjusted under 35 U.S.C. 154(b) by 443 days.

(21) Appl. No.: 12/111,934

(22) Filed: Apr. 29, 2008

(65) Prior Publication Data
US 2009/0249396 A1    Oct. 1, 2009

(30) Foreign Application Priority Data
Mar. 31, 2008    (EP) ..................................... 08006549

(51) Int. Cl.
*H04N 5/455* (2006.01)
*H04N 7/173* (2011.01)
(52) U.S. Cl. ............ 725/105; 725/39; 725/49; 725/100; 725/132; 725/139
(58) Field of Classification Search .................... 725/39, 725/46, 48, 49, 100, 132, 139
See application file for complete search history.

(56) References Cited

U.S. PATENT DOCUMENTS

| | | | |
|---|---|---|---|
| 6,769,127 B1 * | 7/2004 | Bonomi et al. ................. | 725/39 |
| 7,210,159 B2 * | 4/2007 | Roop et al. ..................... | 725/54 |
| 2002/0053084 A1 | 5/2002 | Escobar | |
| 2003/0126600 A1 * | 7/2003 | Heuvelman .................... | 725/35 |
| 2004/0157572 A1 | 8/2004 | Ramaswamy | |
| 2006/0064721 A1 * | 3/2006 | Del Val et al. .................. | 725/41 |
| 2006/0248568 A1 * | 11/2006 | Hamuz-Cohen et al. ..... | 725/132 |
| 2007/0061842 A1 * | 3/2007 | Walter et al. ................... | 725/48 |

FOREIGN PATENT DOCUMENTS
| | | |
|---|---|---|
| GB | 2 427 289 A | 12/2006 |
| WO | 2007/136217 A1 | 11/2007 |

* cited by examiner

*Primary Examiner* — Kieu Oanh T Bui
(74) *Attorney, Agent, or Firm* — Winston Hsu; Scott Margo

(57) ABSTRACT

To provide convenience to usage of an electronic program guide, known as EPG, the present invention provides a method of sharing channel information for a client device coupled to a server including a plurality of communities. The method includes the following steps. A plurality of channels is received to generate a first program list. Community information corresponding to the device is obtained. One of the communities of the server is selected according to the community information. The first program list is then uploaded to the selected community.

21 Claims, 7 Drawing Sheets

| Transponder no. / Frequency | Channel Name | Description |
|---|---|---|
| Astra 2A & B transponders 1-39 use Symbol Rate 27.5 & FEC 2/3 | | |
| 1 | Living+ | Living TV |
| 2 | Challenge+ | Sport |
| 2 | Living | Living TV 2 |
| 4 | MTV Trax | Music&Entertainment |
| 6 | UKTV channels | User by operators |
| 6 | 7611 | Showing UKTV Food +1 |

FIG. 2

METHOD OF SHARING CHANNEL INFORMATION AND RELATED DEVICE

BACKGROUND OF THE INVENTION

1. Field of the Invention

The present invention relates to a method and related device for sharing information, and more particularly to a method and related device for sharing television channel information with categorized communities.

2. Description of the Prior Art

Satellite, broadcasting and cable television (TV) systems are media content delivery systems that can provide plenty of TV, radio and other media channels for a user. With advanced communications technologies, the user can receive programs scheduled on those channels with various client equipments, such as a TV set including a set top box, a personal computer (PC), or a mobile phone.

In a satellite TV system, the client equipment needs to tune to different transponder numbers provided by the satellite. This procedure is so called "channel scanning." After that, related program identities (PIDs) are found and wrote into a file, which is commonly a channel list. However, most channels are not transmitted at any time. Furthermore, channel allocation on frequency bands may be changed due to the sharing of the bandwidth. Scanning channel frequently can resolve the abovementioned problem but becomes burdensome to users. For example, there are generally hundreds, even thousands, channels within European broadcasting system. Scan through those European channels can take tens minutes, frustrating the users who prefer spending time on channel surfing rather than on channel scanning.

In addition, several channels might be missed during channel scanning due to signal decay or weather effect. This causes incomplete channel list, thereby wasting time on the scanning for the users.

Besides, interactive TV functions have been deployed with various interfaces. For example, an Internet electronic program guide (EPG) is an interactive program guide that allows program information and information about a particular type of media to be displayed on the client equipments. The user can download the EPG from an EPG server via Internet Protocol (IP) and import it into the client equipment. An EPG related to a satellite may include transponder numbers, channel frequency, channel name, brief description and other entries. The user can navigate around the EPG, sort the listings, or select a specific channel to watch. In general, the EPG is maintained by the service provider, updated regularly to notify of channel changes including new added channels, deleted channels, change of the channel sort or the channel frequency and so on. The EPG update mechanism only depended on the service provider is inefficient.

Although provision of the Internet EPG eliminates inconvenience of the frequent, time-consuming channel scanning, asynchronous update between the EPG and the channel changes might be a mapping problem that all of the channels displayed on the EPG do not exactly match the channels allocated on the frequency band.

SUMMARY OF THE INVENTION

It is therefore an objective of the present invention to provide a method and related device for sharing media channel information with categorized communities, improving the EPG update mechanism of the prior art.

The present invention discloses a method of sharing channel information for a client device coupled to a server. The method includes the following steps. A plurality of channels is scanned to generate a first program list. Community information corresponding to the device is obtained. A first community from the plurality of communities of the server is selected according to the community information, and the first program list is then uploaded to the first community.

The present invention discloses a device for sharing channel information via a server including a plurality of communities. The client device includes a tuning unit, an identifying unit and an upload unit. The tuning unit scans a plurality of channels to generate a first program list. The identifying unit obtains community information corresponding to the client device. The upload unit is coupled to the identifying unit, and used for selecting a first community from the plurality of communities of the server according to the community information and uploading the first program list to the first community.

The present invention also discloses a satellite broadcasting receiving system. The system includes an antenna, and a client device and an electronic program guide server. Antenna for receiving a plurality of channels from a satellite such that the client device selects one of the channels from the antenna. The electronic program guide server provides a plurality of program list associated with a plurality of community. The client device selects one community from the plurality of communities of the electronic program guide server and uploads a first program list associated with the selected community.

The present invention also discloses a method of sharing channel information for a server coupled to a plurality of client device, the server comprising a plurality of group. The method includes the following steps. The program list is generated according to the channels received by a client device. The server receives the program list and community information from the first client device for storing the program list in corresponding to the community information. Another client device selects one of the communities of the server and submits the request for transmission. The server provides the stored program list in corresponding to the request for transmission.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a schematic diagram of a partial channel list according to FIG. 1.

DETAILED DESCRIPTION

In the following embodiments of the present invention, any mentioned client devices can connect to a server, which includes a plurality of communities, via Internet. Besides, the communities of the server are categorized based on geographic region or satellites. The client device can be a TV set including a set top box, a personal computer (PC), or a mobile phone.

Figure 1:
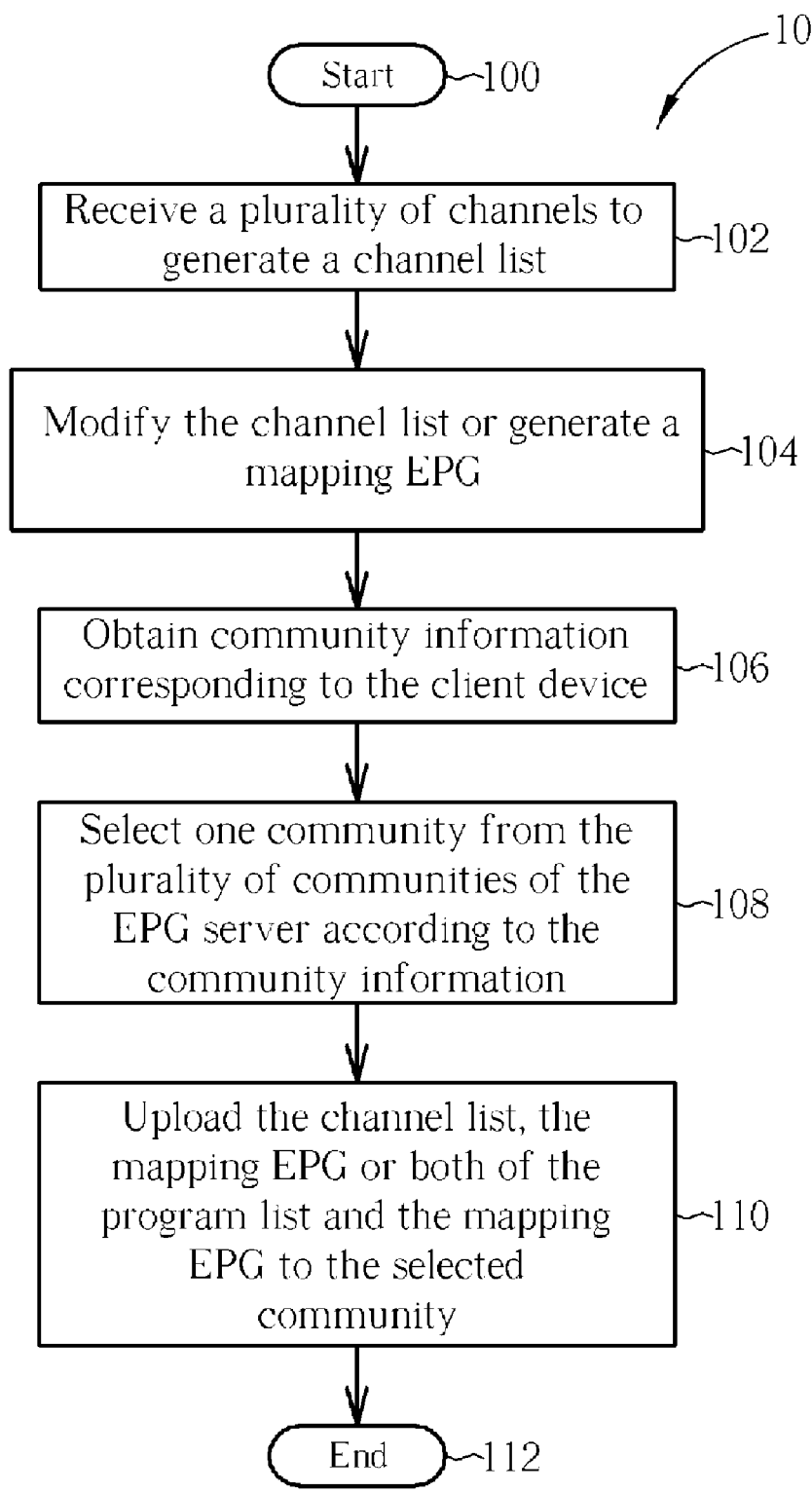
FIG. 1 is a flowchart of sharing program list according to an embodiment of the present invention.

Please refer to FIG. 1, which is a flowchart of a process 10 according to an embodiment of the present invention. The process 10 is applied to a client device, which can receive various broadcasting, cable and satellite channels, and utilized to allow the client device to share channel information with other client devices.

In step 102, the client device can scan broadcasting channels, cable channels and satellite channels to receive channel information, and thereby generates the first channel list. For the first channel list applied to a satellite system, the channel information includes transponder number, channel frequency, channel name and description, as shown in FIG. 2. With the channel name, the users can select a desired program to watch, and from the description, the users can know about corresponding fields (ex. Sport, music or entertainment) of programs scheduled on a specific channel.

Step 104 is executed for modifying the first channel list or modifying a default EPG, originally existing in the client device, based on the first channel list to generate the mapping EPG. The entries of the first channel list in step 102 can be corrected or modified based on user preference. For example, if the channel name of a channel in the first channel list is originally given an official name, the channel name can be replaced by a user-defined name, which is well known for all users. In addition, if a default EPG has been stored in the client device, the channel order, channel name, description or other fields in the default EPG can also be modified to match the received channels information. Those modifications are done for the first channel list or the default EPG to generate the first mapping EPG, which reflects up-to-date channel information and channel order.

Step 106 is executed for obtaining community information about the client device. The community information shall correspond to the way the channel information server categorizes its communities. Preferably, the community information may be information of geographic region about where the client device locates or information of the satellite subscribed by the client device. According to the information obtained in Step 106, Step 108 is then executed for selecting one of the communities of the channel information server. For example, the selected community is categorized by "Astra 1" (a European satellite) or "North Taiwan Area". Step 110 is executed for uploading any of the abovementioned lists to the community selected in Step 108 based on the user preference. The lists can be uploaded via Ethernet, file transfer protocol (FTP) or mobile communications system. As a result, the uploaded lists are published on the channel information server and are shared to all members of the selected community. Members who lack any of the channel list and the mapping EPG can download the latest version of channel information.

Figure 3:
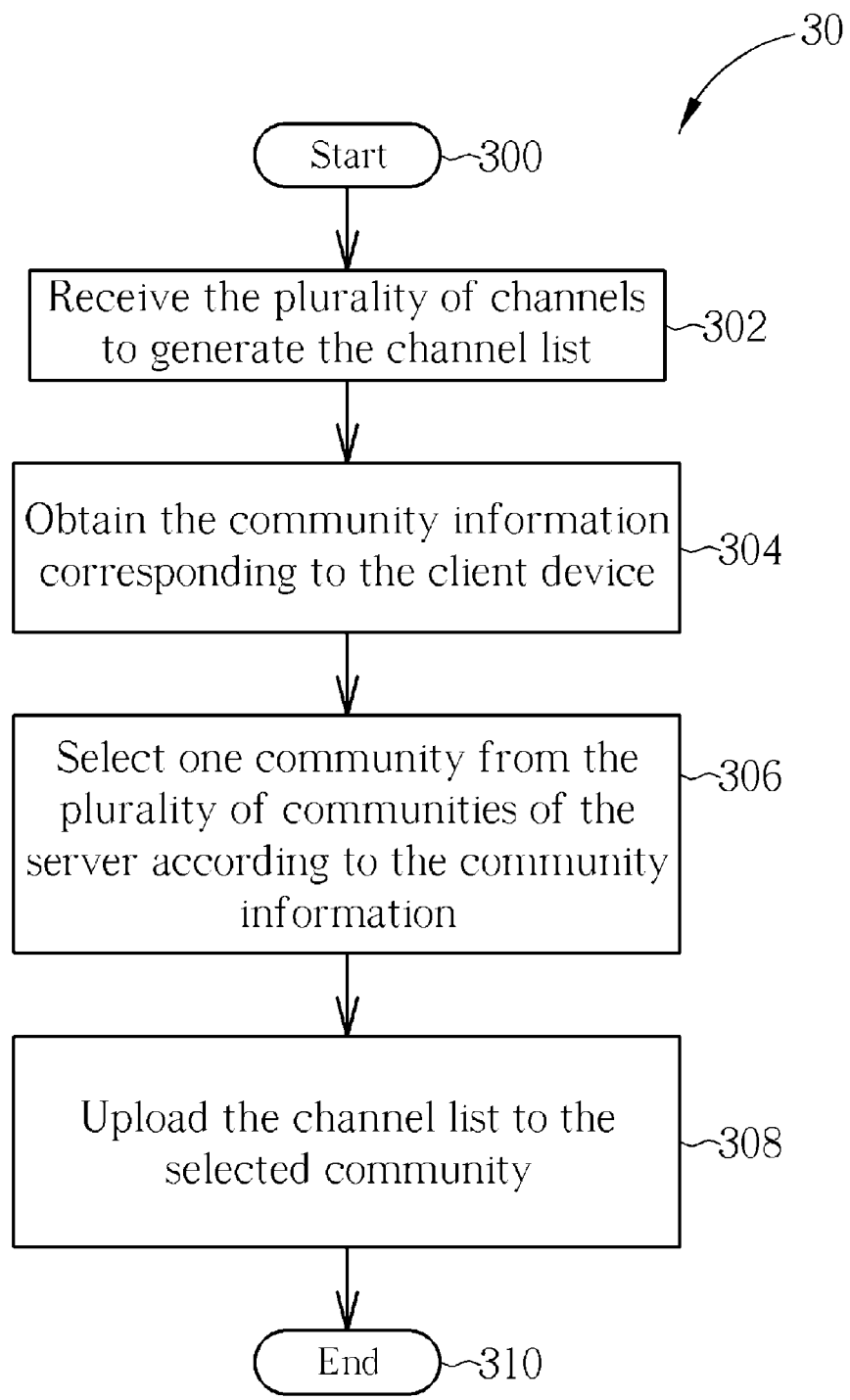
FIG. 3 is a flowchart of sharing program list according to an embodiment of the present invention.

With user's different preference, the process 10 can be partially modified. Please refer to FIG. 3, which is a flowchart of a process 30 according to an embodiment of the present invention.

The process 30 is suitable for a user who only shares the first channel list of FIG. 1 with other users. In step 302, the client device scans the broadcasting, cable and satellite channels and generates the first channel list. The client device further obtains the community information, in step 304. For example, the client device obtains the region code of the cable channels or a geographic identity within the client device. Next, the client device may select on community of the channel information server in step 306, and the client device uploads the first channel list to the selected community of the channel information server in step 308.

Figure 4:
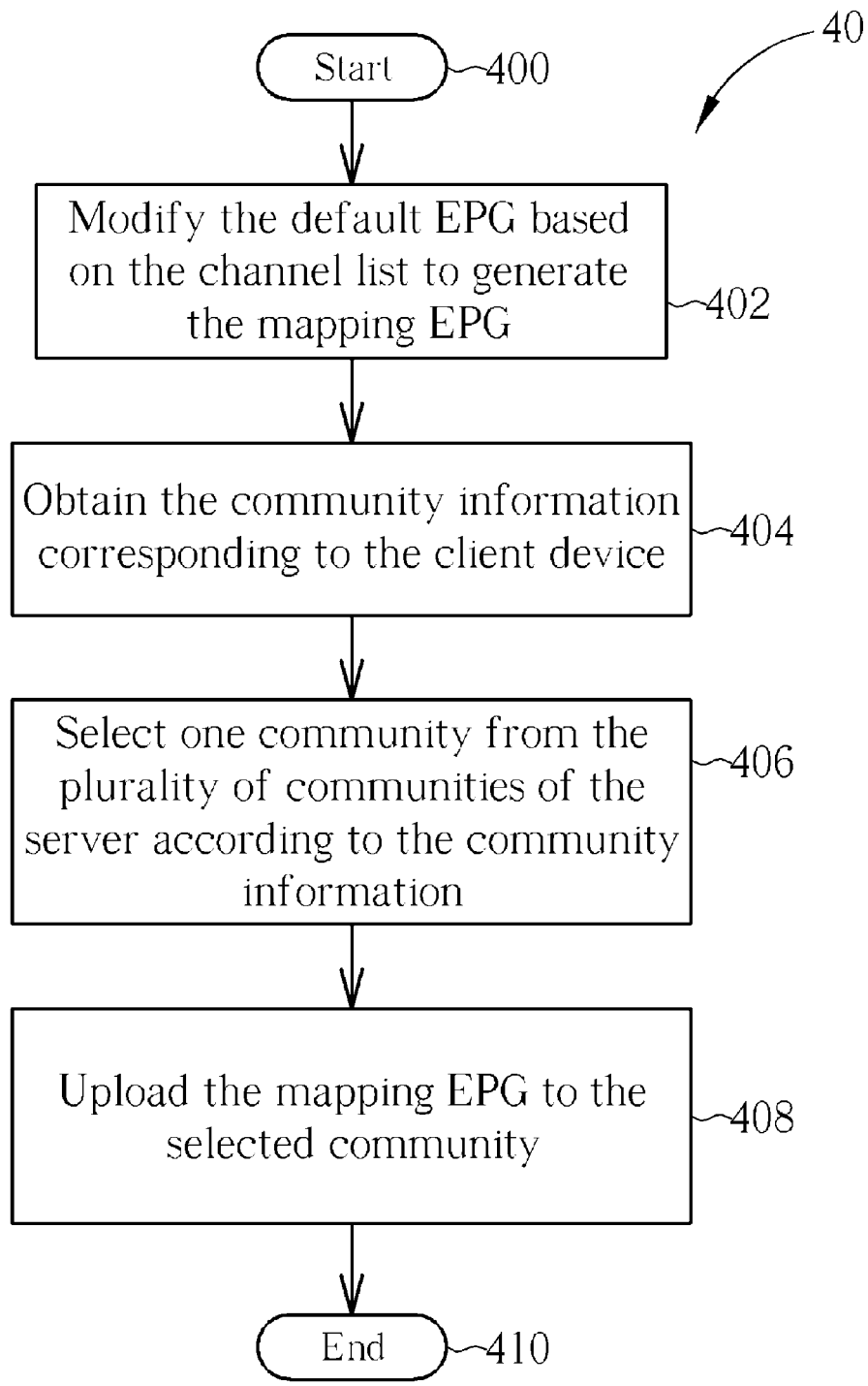
FIG. 4 is a flowchart of sharing program list according to an embodiment of the present invention.

Please refer to FIG. 4, which is a flowchart of a process 40 according to an embodiment of the present invention.

In Step 402, the default EPG is originally used in the client device and the default EPG may be the latest list downloaded from the channel information server. The channel list is achieved by scanning all possible channels received by the client device. Contents of the default EPG are compared with those of the channel list entry by entry. Through the whole comparison, the mapping EPG is generated. The mapping EPG includes at least a table to show the corresponding EPG entry to each entry of the channel list. Steps 404 and 406 are taken the same actions as Steps 106 and 108 and detailed description thereof is omitted. Step 408 is executed for only uploading the mapping EPG to the selected community to share with other community members.

Figure 5:
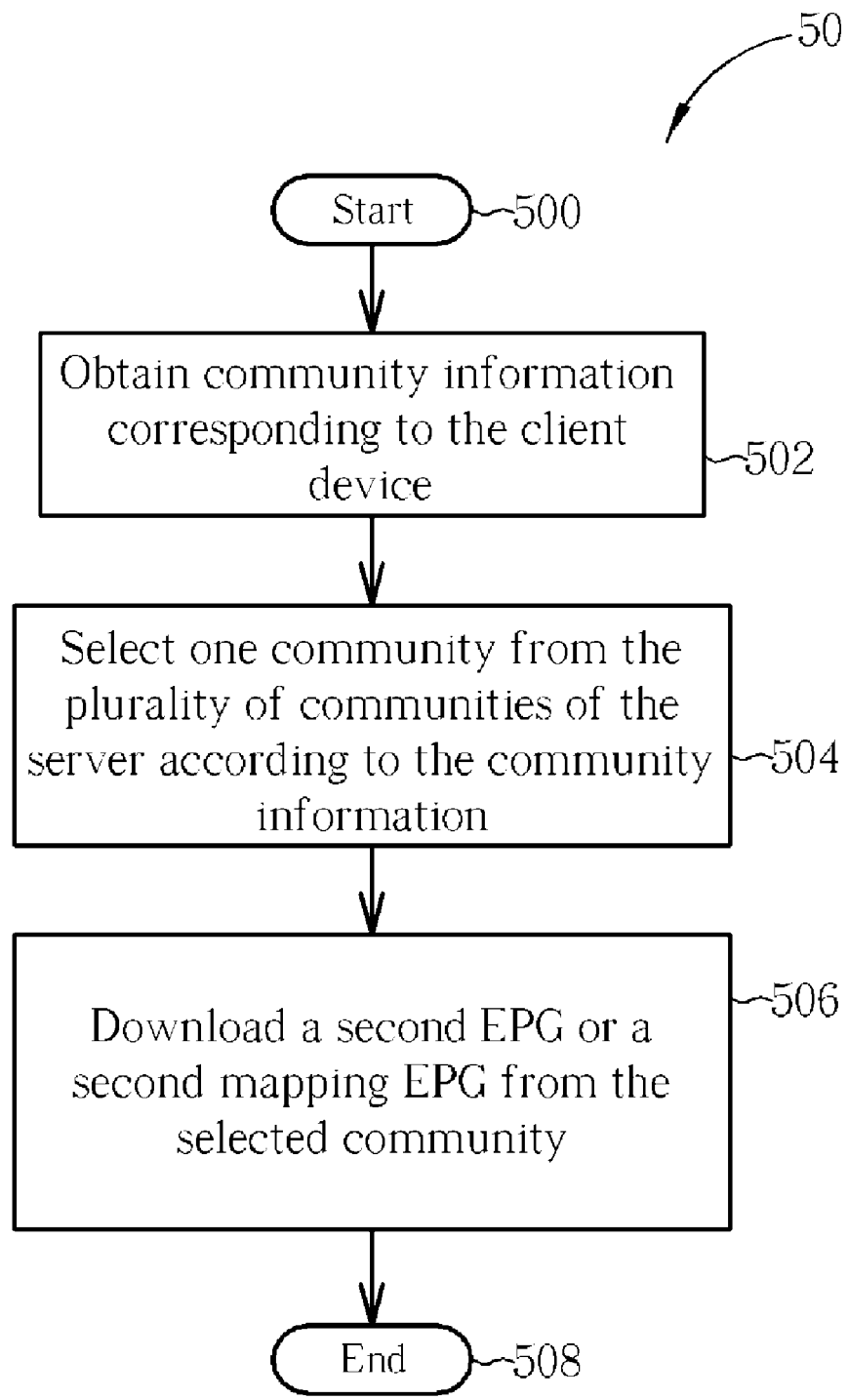
FIG. 5 is a flowchart of receiving program list according to an embodiment of the present invention.

Please refer to FIG. 5, which is a flowchart of a process 50 according to an embodiment of the present invention.

The process 50 is applied to a user who attempts to skip channel scan and still would like obtaining the latest channel information corresponding to specific satellite, broadcasting or cable channels. Step 502 is executed for obtaining the community information related to the client device so that the client device can identify its geographic or satellite information, such as a zip code or a satellite model. The user is one of members of the channel information server and thereby the type of the community information is obtained based on the community joined by the user. Step 504 is executed for selecting the community based on the community information obtained in Step 502. The selected community is usually the community that the user joins. Step 506 is then executed for downloading the second EPG or the second mapping EPG from the selected community. The downloaded list is preferably the latest list, which is uploaded by any users executing the process 10, 30 or 40. After Step 506, the client device can modify the downloaded list according to the received channels and further imports the downloaded list to be a default EPG to receive programs scheduled on the channels.

Through the processes 10, 30-50, the client device can share the channel information, irrespective of the first channel list or the first mapping EPG, with each other. As a result, cooperation of all users can enhance channel information updating mechanism. In addition, the client device can be identified by their geographic and/or satellite information so that the list or EPG can be uploaded to the right community. In this situation, it is reliable and convenient for the client device to download the list or EPG from the right community, thereby saving time for the user.

Figure 6:
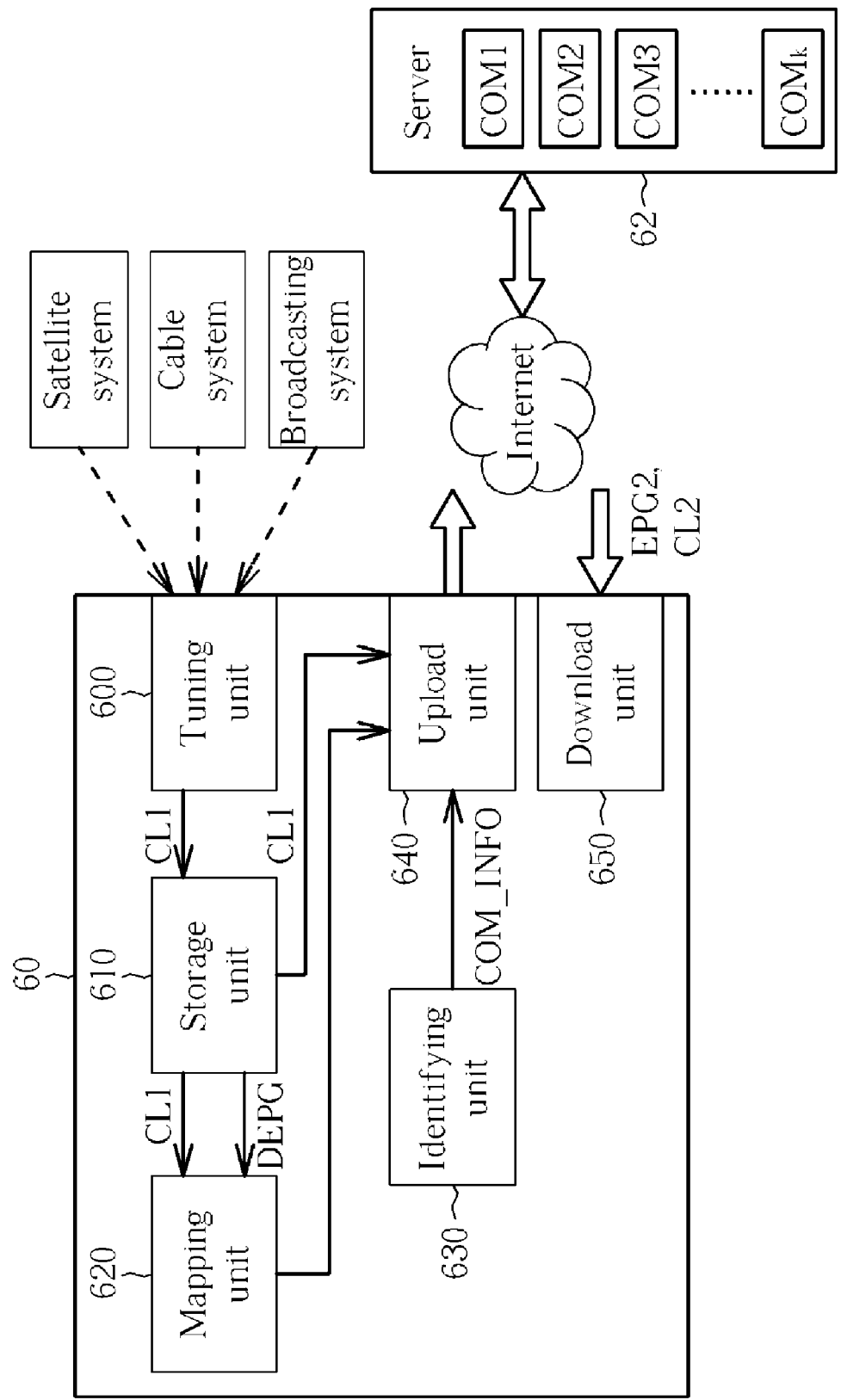
FIG. 6 is a schematic diagram of a client device according to an embodiment of the present invention.

Please refer to FIG. 6, which is a schematic diagram of a client device 60 according to an embodiment of the present invention. In FIG. 6, a server 62 connects with the client device 60 via Internet and includes communities COM1-COMk. The client device 60 includes a tuning unit 600, a storage unit 610, a mapping unit 620, an identifying unit 630, an upload unit 640 and a download unit 650. The tuning unit 600 scans a plurality of channels to generate a first channel list CL1, where the plurality of channels may include broadcasting, cable and satellite channels. The storage unit 600 stores the first channel list CL1. The mapping unit 620 modifies the first channel list CL1 to generate a first mapping EPG EPG1. Alternatively, the mapping unit 620 can modify a default electronic program guide DEPG, stored in the storage unit 600, based on the first channel list CL1 to generate the first mapping electronic program guide EPG1. The identifying unit 630 obtains community information COM_INFO corresponding to the client device. The community information COM_INFO may be information about a geographic region, where the client device 60 locates, or about satellite(s), where the client device 60 can access channels. The geographic region is preferably a zip code, applied to the broadcasting system. The upload unit 640 selects a first community COMx from the communities COM1-COMk according to the community information COM_INFO, where x=1 ... k.

For example, assume that the community COM2 of the server 62 collects channel information only about the Astral satellite whereas the community COM3 of the server 62 collects channel information about a local zip code set covering a northern area, such as a zip code set from 100 to 315 in Taiwan. When the client device 60 scans the channels from an Astral satellite, the COM2 shall be selected. When the client device 60 scans the channels from a broadcasting TV system, the COM3 shall be selected.

After the community selection, the upload unit 640 uploads the first channel list CL1, the first mapping electronic program guide EPG1 or both of the first channel list CL1 and the first mapping electronic program guide EPG1 to the selected first community COMx. The download unit 650 is used for downloading a second channel list CL2 or a second mapping electronic program guide EPG 2 from the communities COM1-COMk according to the community information COM_INFO. For example, if the user would like the latest channel information related to the Astral satellite, the download unit 650 selects the community COM2 according to the community information COM_INFO.

Figure 7:
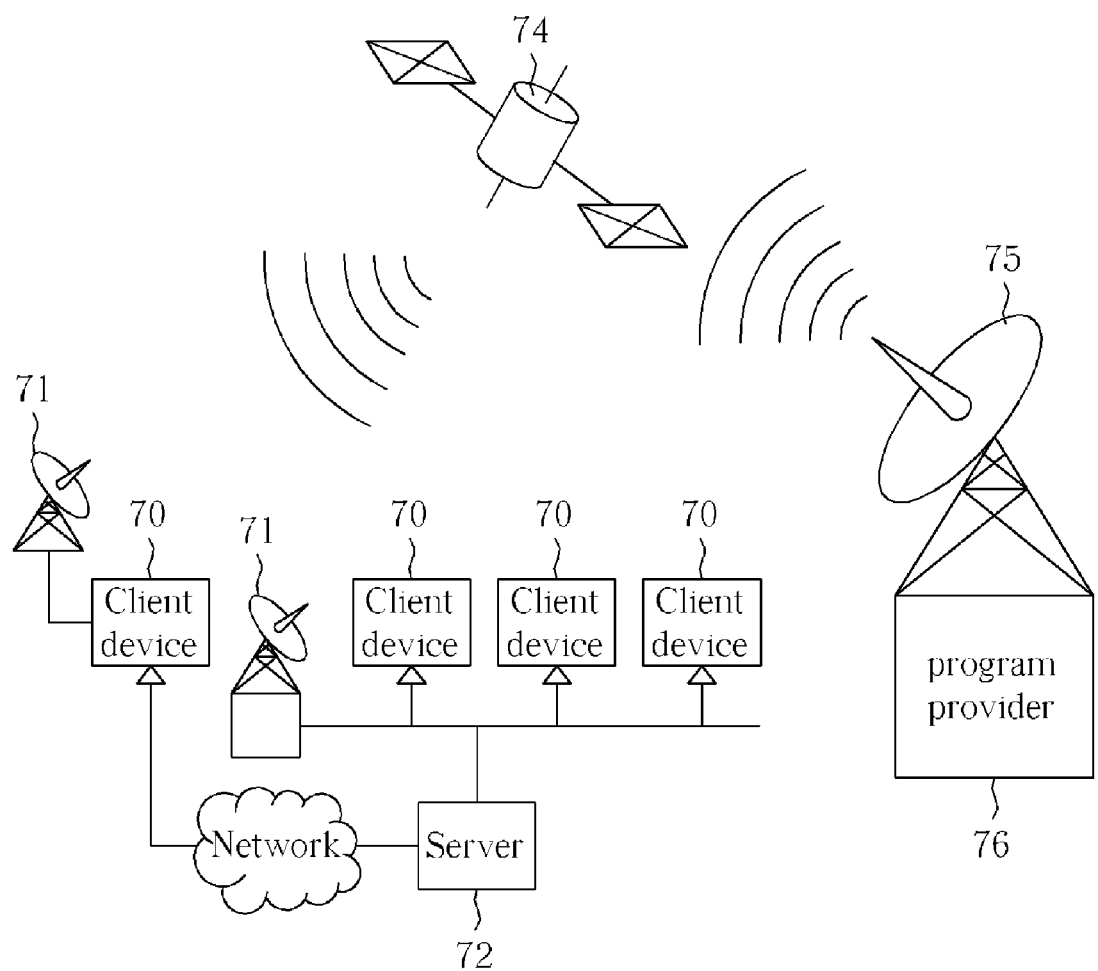
FIG. 7 is a schematic diagram of satellite broadcasting system according to an embodiment of the present invention.

Please refer to FIG. 7 illustrating a satellite broadcasting system. The satellite 74 receives the signal from the transceiver 75 of the program provider 76, such as the TV station. The signal carriers a plurality of channels embedded with different contents or TV programs. The satellite broadcasts the signal to the receivers 71. The client devices 70 select one of the channels from the receivers 71 as the user desired regardless to the limitation of distance and landform. The system also provides a server 72 which may connects to the client devices 71 by the network.

Similar to the embodiment in FIG. 6, the server 72 may stores a plurality of program list and grouping the program lists according to the community information. The community information may be the geographic information of the client device. One of the client devices 70 generates the program list according to the channels of the receiver 71 and uploads the program list to the server 72. The client device 70 may download the previous program list from the server 72 and updated the program list to the server 72 according to the delivered channels if the actual delivered channels are changed. Another client device 70 may download the program list by select the desired community of the server 72. The program list may be the channel list, the electronic program guide or the mapping electronic program guide in previous embodiments of the invention. In this embodiment, the program list could be shared with other users.

Another embodiment as the present invention is illustrated as FIG. 6 and FIG. 7. The server 72 may receives the channels from the receiver 71 directly and update the program list according to the delivered channels. For example, the server 72 may update the previous channel list, update the electronic program guide or generates the mapping electronic program guide according to the delivered channels from the receiver. The client devices 70 may download the program list by selecting the desired community.

In the embodiments of the present invention, the communities are maintained by the users who locate at the same geographic region or access the same satellite. The user is allowed to skip channel scanning or channel matching and can still obtain the latest channel information by downloading the channel list or EPG from the corresponding community of the channel information server. The user may selected the desired community of the channel information server and submit a request for transmission to the channel information server. The channel information server will provide the corresponding program list to the selected community after received the request of transmission. Therefore, cooperation of the users in the same community can enhance the EPG update mechanism.

Those skilled in the art will readily observe that numerous modifications and alterations of the device and method may be made while retaining the teachings of the invention.

What is claimed is:

1. A method of sharing channel information for a plurality of client devices coupled to a server, the server comprising a plurality of communities, the method comprising:
   generating a first program list by scanning a plurality of channels received by a first client device, wherein the first program list contains a satellite transponder number corresponding to each channel of the plurality of channels in the first program list;
   obtaining community information corresponding to the first client device;
   selecting one community from the plurality of communities of the server according to the community information and uploading the first program list to the selected community, wherein the community information comprises geographic information of the first client device; and
   a second client device corresponding to the selected community downloading the first program list from the server so as to skip scanning the plurality of channels.

2. The method of claim 1 further comprising storing the first program list.

3. The method of claim 1, wherein the plurality of received channels comprises broadcasting channels, cable channels, and satellite channels.

4. The method of claim 1 further comprising:
   downloading a second program list according to the community information; and
   modifying the second program list according to the plurality of received channels.

5. The method of claim 4 further comprising selecting one community from the plurality of communities of the server according to the community information and uploading the modified second program list to the selected community.

6. The method of claim 1 further comprising:
   downloading an electronic program guide according to the community information; and
   generating a mapping electronic program guide according to the electronic program guide and the plurality of received channels.

7. The method of claim 1, wherein the community information comprises satellite information of the first client device.

8. A first client device for sharing channel information for a server comprising a plurality of communities, the first client device comprising:
   a tuning unit for scanning a plurality of channels to generate a first program list, wherein the first program list contains a satellite transponder number corresponding to each channel of the plurality of channels in the first program list;
   an identifying unit for obtaining community information corresponding to the first client device; and an upload unit coupled to the identifying unit, for selecting one community from the plurality of communities of the server according to the community information and uploading the first program list to the selected community;

wherein the community information comprises geographic information of the first client device, and a second client device corresponding to the selected community downloads the first program list from the server so as to skip scanning the plurality of received channels.

9. The first client device of claim 8 further comprising a storage unit coupled to the tuning unit and the upload unit, for storing the first program list.

10. The first client device of claim 8, wherein the plurality of channels comprises broadcasting, cable and satellite channels.

11. The first client device of claim 8 further comprising:
a download unit for downloading a second program list according to the community information; and
a mapping unit for modifying the second program list according to the channels from the tuning unit.

12. The first client device of claim 8 further comprising:
a download unit for downloading an electronic program guide according to the community information; and
a mapping unit for generating a mapping electronic program guide according to the electronic program guide and the channels from the tuning unit.

13. The first client device of claim 8, wherein the community information comprises satellite information of the first client device.

14. A satellite broadcasting receiving system comprising:
an antenna for receiving a plurality of channels from a satellite;
a first client device coupled to the antenna for selecting one of the channels; and
an electronic program guide server coupled to the first client device providing a plurality of program lists associated with a plurality of communities;
wherein the first client device selects one community from the plurality of communities of the electronic program guide server and uploads a first program list associated with the selected community so that a second client device corresponding to the selected community downloads the first program list so as to skip scanning the plurality of received channels, wherein the first program list contains a satellite transponder number corresponding to each channel of the plurality of received channels.

15. The system of claim 14, wherein the first client device modifies the first program list according to the received channels from the antenna.

16. The system of claim 15, wherein the first client device selects one community from the plurality of communities of the electronic program guide server and uploads the modified first program list to the selected community.

17. The system of claim 14 further comprising an identifying unit for obtaining community information corresponding to the first client device, wherein the first client device selects one community from the plurality of communities of the electronic program guide server according to the community information corresponding to the first client device.

18. A method of sharing channel information for a server coupled to a plurality of client devices, the server comprising a plurality of groups, the method comprising:
receiving a program list generated from a plurality of channels delivered to a first client device of the plurality of the client devices, wherein the program list contains a satellite transponder number corresponding to each channel of the plurality of channels in the program list;
receiving community information from the first client device;
receiving a request for transmission from a second client device of the plurality of the client devices, the request for transmission providing a selected community; and
providing the program list in corresponding to the selected community of the request for transmission;
wherein the community information comprises geographic information of the first client device and the second client device downloads the program list so as to skip scanning the plurality of delivered channels.

19. The method of claim 18 further comprising providing community information to the second client device.

20. The method of claim 18, wherein the plurality of delivered channels are selected from a group consisting of broadcasting channels, cable channels, and satellite channels.

21. The method of claim 18 further comprising storing the program list in corresponding to the received community information from the first client device.

* * * * *